June 3, 1952     I. J. EHRENBERG     2,599,376
DUAL BRAKE CONTROL

Filed Nov. 7, 1951     2 SHEETS—SHEET 1

INVENTOR.
IRA J. EHRENBERG
BY
ATTORNEY

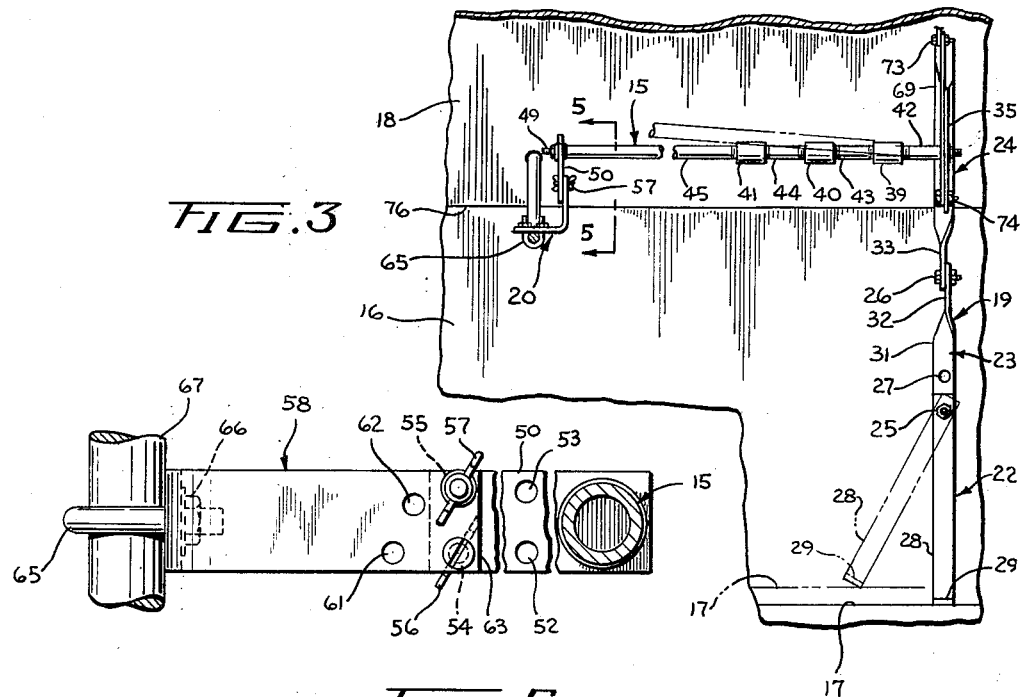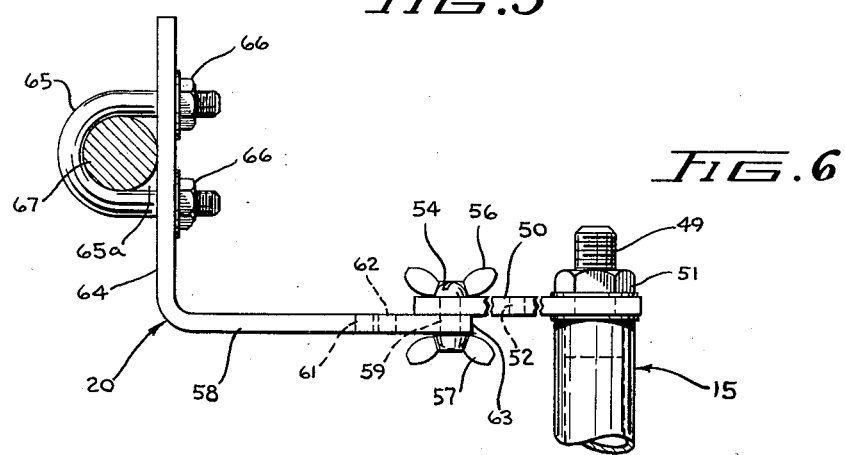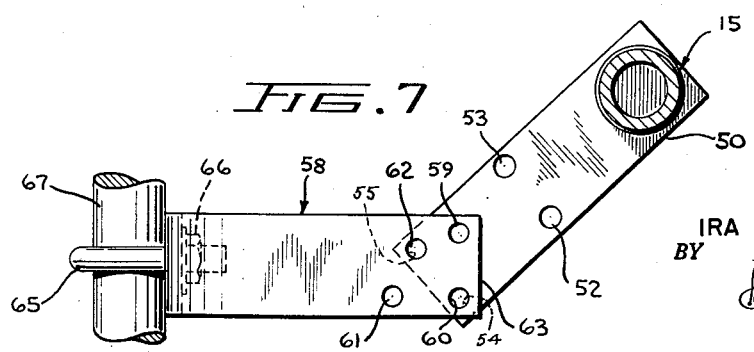

Patented June 3, 1952

2,599,376

UNITED STATES PATENT OFFICE 2,599,376

DUAL BRAKE CONTROL

Ira J. Ehrenberg, Flushing, N. Y.

Application November 7, 1951, Serial No. 255,156

13 Claims. (Cl. 74—562.5)

This invention relates to dual control devices for use in automobiles, and particularly to portable brake controls which are movable from car to car and are suitable for instruction purposes.

It is primarily within my contemplation to provide a dual brake control device adapted for installation in cars of various makes and proportions, without the need to employ any attaching fixtures which would mar or mutilate the car or its components. And in this aspect of my invention it is an object to provide an apparatus of the said category which can readily be installed in a car and adjusted to fit the dimensions and spacing of the car components with which it is intended to cooperate.

More specifically, it is one of the important objects of this invention to present a dual brake control unit which can, without any special technical skill, be positioned upon the floor of a car and attached to a control member such as a brake pedal, the parts of the device being easily adjustable for different lengths and widths of floors, for various distances between the seat and the front wall of the car and between the seating position of the instructor and the position of the pedal, and for different angular inclinations of the sloping floor board. And it is within my contemplation to enable said adjustments to be effected by the use of relatively simple elements and without the use of relatively expensive universal joints and linkage.

It is also an object of my invention to provide readily adjustable means for enhancing the stability of the device, without in any way impairing its portability or efficiency.

Other objects, features and advantages will appear from the drawings and the description hereinafter given.

Referring to the drawings:

Figure 3 is a fragmentary plan view of Figure 2, the dot-dash representation of the seat showing an adjusted forward position thereof, the rear bar being shown by dot-dash lines in a correspondingly adjusted angular position.

Figure 5 is an enlarged fragmentary section of Figure 3 taken along line 5–5.

Figure 6 is a fragmentary side view of Figure 5, and

Figure 7 is a view which is substantially like Figure 5, but showing the two main components thereof in angular relation, the wing nuts being removed.

Figure 1:
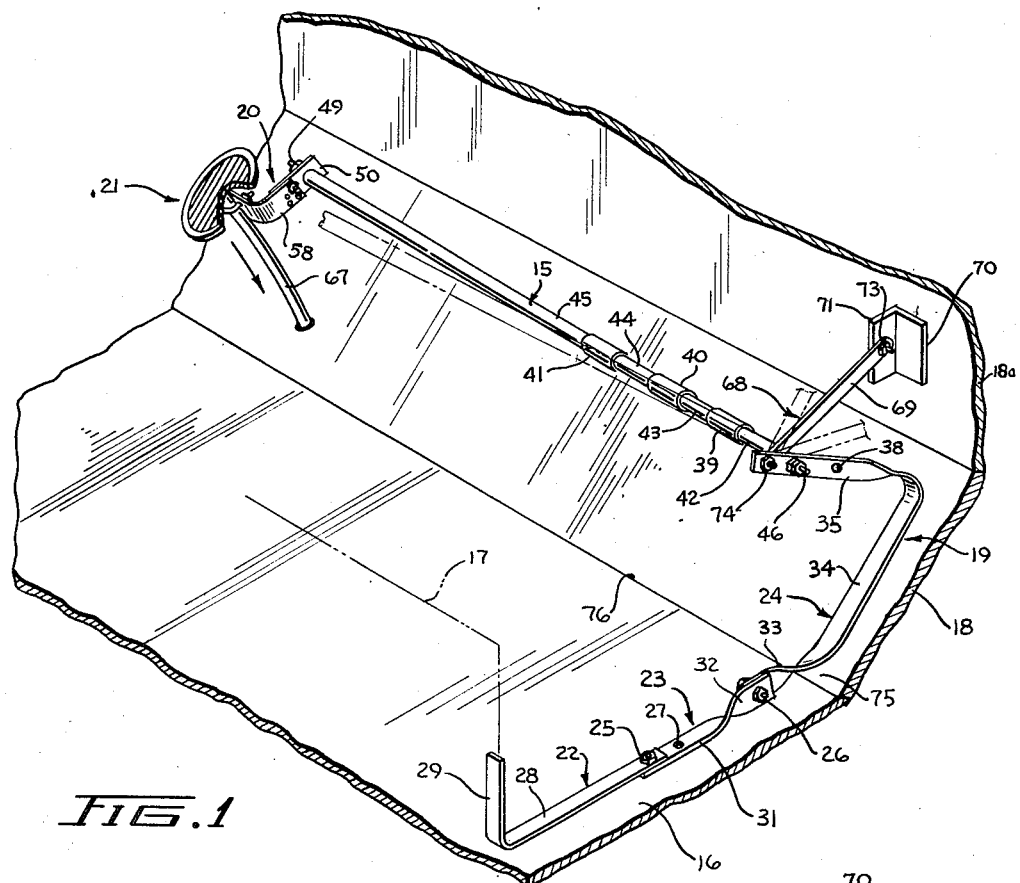
Figure 1 is a fragmentary perspective view of the forward partition of a car showing a preferred form of my invention operatively in place, portions being broken away for clarity, the location of the front seat being shown by dot-dash lines.

In the preferred form of my invention illustrated, a main control rod 15 is employed extending transversely along and above the floor 16, forwardly of the front seat 17 and rearwardly of the inclined floor board 18, whereby the said rod is disposed between the chauffeur student seated behind the steering wheel and the instructor seated to his right. The control rod 15 is operatively supported at its right end by the adjustable support 19, the left end being attached to the bracket 20 which is secured to the brake pedal member 21—all in a manner to be hereinafter set forth.

The said adjustable support 19 comprises, in the particular embodiment of my invention illustrated in the drawings, a rear bar 22, an intermediate link 23 and a front bar 24, the said link overlapping the adjacent terminals of said bars and being pivotally connected thereto by the respective bolts 25 and 26 extending through holes in said overlapping portions, the link 23 containing another hole 27 adapted to receive therethrough the bolt 25 when the effective length of the link is to be shortened, in known manner, for effecting an adjustment in the length of said support 19. The said bars and link are preferably made of flat stock, so that they may readily be twisted, and adjustably and pivotally connected, thereby constituting an economical but efficient structure.

The rear bar 22 has a forward horizontal section 28 and a rear upwardly extending section 29 at an angle thereto, preferably a right angle, the section 28 being in a horizontal plane so that its flat surface 30 will rest upon the floor 16. The intermediate link 23 has a rear section 31 parallel to the plane of section 28, the link being twisted at right angles to form a forward section 32 whose plane is at right angles to that of section 31. The front bar 24 has a relatively short rearmost section 33 parallel to section 32 of the link, bar 24 being twisted and bent to form the upwardly and forwardly inclined intermediate section 34, and the upper rearwardly extending section 35 constituting the supporting arm for the said rod 15.

It will be observed that arm 35 is in a substantially vertical plane, so that the holes at 36, 37, and 38 thereof will readily accept the right terminal portion of the rod 15, as will more clearly hereinafter appear.

The said rod 15 is, in its preferred form, a tubular pipe member a portion of which comprises the pipe fittings 39, 40, and 41 in threaded engagement with the pipe sections 42, 43, 44, and 45, respectively. The arrangement is hence such that by adjustably rotating said fittings about their respective sections, or removing one or more of said fittings and sections, or by adding similar fittings and sections, the length of said rod 15 may be adjustably varied. The right terminal of said rod has affixed thereto the stud 46 which extends through one of the holes in said arm 35, the drawing showing the stud extending through hole 37. A nut and lock nut 47 and 48, respectively, are mounted over the terminal portion of the stud, the length and diameter of the stud, and the position of said nuts being such that a loose right end mounting is formed for the rod 15. It is preferred that the holes 36, 37, and 38 be sufficiently large as to permit a limited universal connection between the arm 35 and the stud 46, so that the control bar 15 may, within predetermined limits, be moved angularly, as indicated in Figure 3, whereby it will adjust itself for connection to the brake pedals of conventional automobiles.

The left end of the rod 15 has the threaded stud 49 secured thereto, the bar 50 of the bracket 20 being mounted thereover and preferably, although not necessarily, rigidly affixed thereto by the nut 51. In the form shown, the bar 50 has two pairs of holes therein, 52, 53, and 54, 55, the latter pair being further from rod 15 than the former. Attached to bar 50 by wing nuts 56 and 57 is the angle bar 58 also having, in the form illustrated, two pairs of holes, 59, 60, and 61, 62. It will be seen that holes 59 and 60 are adjacent edge 63 of the angle bar 58, and parallel to the edge, whereas holes 61 and 62 are in a line which is angularly disposed to said edge. The arrangement is hence such that when the holes 59 and 60 are placed in registry with either pair of holes in bar 50, the section 64 of the angle bar will extend parallel to the bar 50, whereas when the holes 61 and 62 are employed, the angle bar is turned at an angle, as shown in Figure 7. It is understood, of course, that the arrangement of holes in bracket 20 is not limited to that shown in the drawings, as other and differently positioned holes may be employed to vary the positions of the components 50 and 58 with respect to each other, so that the angle bar 58 may be operatively secured to pedal members of different cars.

The section 64 of angle bar 58 has the U-shaped clamp member 65 adjustably secured thereto by the nuts 66, the arms of the clamp member extending through suitable holes in said section 64, to leave space 65a for accommodating the rod 67 of the pedal member 21, a tightening of said nuts 66 effecting a clamping action around rod 67 in known manner.

In the preferred construction of my invention I employ a stabilizing member 68 comprising a bar 69 and pivotal base 70, the latter being illustrated as an angle bar the leg 71 of which is pivotally secured to the forward end 72 of bar 69 at 73. The rear end of bar 69 is pivotally connected by bolt 74 to a selected hole in arm 35 of bar 24. In the drawings the bar 69 is shown connected to hole 36, whereby the right terminal portion of the rod 15 will serve as a stop to the downward movement of bar 69, as indicated by the dot-dash lines of Figure 2. The arrangement is hence such that the pivotal base 70 will engage the vertical wall 18a adjoining the inclined floor board 18, to accomplish its stabilizing function, as will hereinafter appear.

In the operation of my invention, the device is placed upon the floor of the front compartment of a car, with the parts thereof disposed as above described, there being no attachment to the car except the removable connection with the pedal. Wherever necessary, adjustments are made for length, width and spacing, by means of the above-mentioned adjusting elements. I have found that such adjustments are very readily made, and can be effected in a few minutes; and once the adjustment has been completed for a particular car, no further adjustments need be made for the same model of car.

The intermediate section 34, pivotally connected at 26, will readily adjust itself to any inclination of floor board 18, and when so adjusted will rest firmly against said board. It will be observed that there is, in the embodiment illustrated, a space 75 between the juncture of said intermediate section 34 and the said link 23, and the juncture 76 of the floor 16 and said inclined board 18. The arrangement is hence such that the device is not dependent, for its stability, upon a well-defined and unobstructed juncture between the floor 16 and inclined wall 18, which is not always to be found in an automobile that has been in continuous use—the stabilization being effected by the cooperation between the said stabilizing member 16 and said rear section 29.

Figure 2:
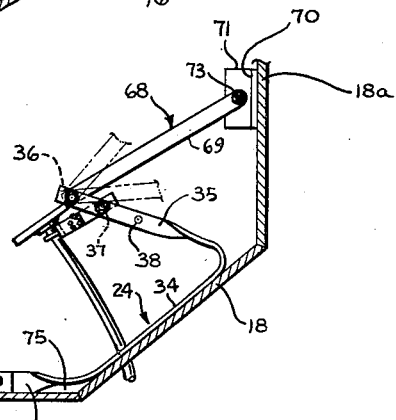
Figure 2 is a side view of the arrangement of Figure 1, the stabilizing member being shown by dot-dash lines in different adjusted positions.
Figure 4:
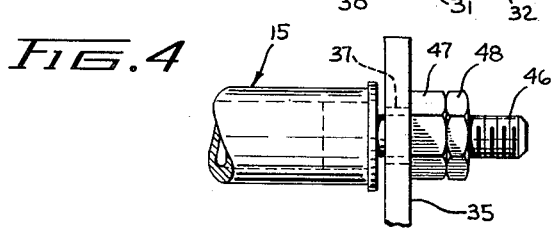
Figure 4 is an enlarged fragmentary plan view of the right terminal portion of the main control rod showing its connection with the supporting member.

The rear section 29 of bar 22 is placed against the forward wall of seat 17, and the base member 70 is adjustably moved for engagement with the vertical wall 18a, as illustrated in Figures 1 and 2. Since the main control rod 15 is supported at both ends by the arm 35 and the bracket 20, and since the main support 19 is held, at the front and rear ends thereof, by the stabilizing member 68 and the said rear section 29, the entire structure is firmly held in place, and will not be dislodged when the device is operatively actuated. In other words, there can be no substantial forward or rearward movement of the said support 19; and neither can there be a forward or rearward movement of the bracket 20, relative to the pedal member; and accordingly, the control bar 15 is maintained in operable position against substantial displacement and is operatively movable only when the pedal 21 or the control rod itself, or both of them, are operatively actuated.

In the apparatus as above set up, the pedal member 21 is entirely free and unobstructed, so that the chauffeur or learner can readily engage it with his foot. And when the instructor desires to operate the brake pedal all he needs to do is kick or push the main control rod 15 forwardly and downwardly, and the brake will be operatively depressed.

In the event it is desired to adjust the seat 17 by moving it forwardly, all that need be done is to swing the rear bar 22 about its pivot at 25, thereby enabling the seat to be moved forwardly without hindrance. Thereafter the said rear bar 22 is rotated back until the upright section 29 thereof is in abutment with the seat 17 as shown in Figure 3. It has been found that this arrangement not only provides a sufficient resistance against forward and lateral shifting of the supporting member 19, but that the angular disposition of bar 22 adds further stability to the device.

It is to be noted that the entire structure is composed of relatively simple standard parts which can be readily fabricated at low cost, and easily assembled with a minimum of effort.

In the above description, the invention has been disclosed merely by way of example and in preferred manner; but obviously many variations and modifications may be made therein.

It is to be understood, therefore, that the invention is not limited to any specific form or manner of practicing same, except insofar as such limitations are specified in the appended claims.

I claim:

1. In a loosely mounted dual pedal control device for an automobile having a horizontal floor and an inclined floor board adjacent thereto, a main control rod, a bracket at one end thereof adapted for attachment to the pedal, and a supporting member at the other end of the rod; said member comprising a rear bar adapted to rest upon the floor of the automobile and having a seat abutment member at the rear thereof, a front bar having an upwardly and forwardly inclined section adapted to rest against the inclined floor board of the automobile and an arm extending rearwardly from said inclined section, and pivotal connecting means between said front and rear bars, said arm being in supporting engagement with said rod.

2. In a loosely mounted dual pedal control device for an automobile having a horizontal floor and an inclined floor board adjacent thereto, a main control rod, a bracket rigidly secured to one end thereof and adapted for attachment to the pedal, and a supporting member at the other end of the rod; said member comprising a rear bar adapted to rest upon the floor of the automobile and having a seat abutment member at the rear thereof, a front bar having an upwardly and forwardly inclined section adapted to rest against the inclined floor board of the automobile and an arm extending rearwardly from said inclined section, and pivotal connecting means between said front and rear bars, said rod being loosely supported by said arm, whereby the rod may be moved relative to the supporting member.

3. In a loosely mounted dual control device for an automobile pedal, the combination according to claim 1, and limiting means on said arm and the terminal of said rod adjacent the arm for limiting the movement of the rod relative to said supporting member.

4. In a loosely mounted dual pedal control device for an automobile having a horizontal floor, an inclined floor board adjacent thereto, and a vertical wall adjoining said floor board, a main control rod, a bracket at one end thereof adapted for attachment to the pedal, a supporting member at the other end of the rod, and stabilizing means; said member comprising a rear bar adapted to rest upon the floor of the automobile, and a front bar having an upwardly and forwardly inclined section adapted to rest against the inclined floor board of the automobile and an arm extending rearwardly from said inclined section, said arm being in supporting engagement with said rod; said stabilizing means comprising a pivotally supported base mounted on the said supporting member and disposed forwardly therefrom, said base being adapted for engagement with said vertical wall.

5. In a loosely mounted dual pedal control device for an automobile having a horizontal floor, an inclined floor board adjacent thereto, and a vertical wall adjoining said floor board, a main control rod, a bracket at one end thereof adapted for attachment to the pedal, a supporting member at the other end of the rod, and stabilizing means; said member comprising a rear bar adapted to rest upon the floor of the automobile and having a seat abutment member at the rear thereof, a front bar having an upwardly and forwardly inclined section adapted to rest against the inclined floor board of the automobile and an arm extending rearwardly from said inclined section, and pivotal connecting means between said front and rear bars, said arm being in supporting engagement with said rod, said stabilizing means comprising a pivotally supported base mounted on the said arm and disposed forwardly therefrom, said base being adapted for engagement with said vertical wall.

6. In a loosely mounted dual control device for an automobile pedal, the combination according to claim 5, said seat abutment member comprising a rear section extending upwardly from said rear bar, said stabilizing means having a bar pivotally mounted at one end thereof to said arm, the other end of said latter bar having pivotally mounted thereon said base.

7. In a loosely mounted dual control device for an automobile pedal, the combination according to claim 5, said arm having a plurality of apertures along the length thereof, said bar being operatively supportable by said arm at any of said apertures; said stabilizing means having a bar pivotally mounted at one end thereof to said arm, the other end of said latter bar having pivotally mounted thereon said base, the bar of said stabilizing means being pivotally supportable by said arm at any of said apertures.

8. In a loosely mounted dual control device for an automobile pedal, the combination according to claim 5, said stabilizing means having a bar pivotally mounted at one end thereof to said arm, the other end of said latter bar having pivotally mounted thereon said base, said latter bar being engageable with the said main control rod upon the pivotal movement of the bar, whereby the operative movement of said latter bar will be limited by said control rod.

9. In a loosely mounted dual pedal control device for an automobile having a horizontal floor and an inclined floor board adjacent thereto, a main control rod, a bracket at one end thereof adapted for attachment to the pedal, and a supporting member at the other end of the rod; said member comprising a rear bar adapted to rest upon the floor of the automobile and having a seat abutment member at the rear thereof, a front bar having an upwardly and forwardly inclined section adapted to rest against the inclined floor board of the automobile and an arm extending rearwardly from said inclined section, and an intermediate link pivotally connected to both said front and rear bars, said front bar being pivotally movable upwardly and said rear bar being pivotally movable laterally, said arm being in supporting engagement with said rod.

10. In a loosely mounted dual pedal control device for an automobile having a horizontal floor and an inclined floor board adjacent thereto, a main control rod, a bracket at one end thereof adapted for attachment to the pedal, and a supporting member at the other end of the rod; said member comprising a rear bar adapted to rest upon the floor of the automobile and having a seat abutment member at the rear thereof, a front bar having an upwardly and forwardly inclined section adapted to rest against the inclined floor board of the automobile and an arm extending rearwardly from said inclined section, and an intermediate link pivotally connected to both said front and rear bars, the pivotally connected portions of said link and said front bar being above the level of the portion of the said rear bar resting upon the floor of the automobile, whereby a space will be provided between the juncture of the automobile floor and inclined floor board and the said pivotally connected portions of the link and front bar.

11. In a loosely mounted dual pedal control device for an automobile having a horizontal floor and an inclined floor board adjacent thereto, a main control rod, a bracket at one end thereof adapted for attachment to the pedal, and a supporting member at the other end of the rod; said member comprising a rear bar adapted to rest upon the floor of the automobile and having a seat abutment member at the rear thereof, a front bar having an upwardly and forwardly inclined section adapted to rest against the inclined floor board of the automobile and an arm extending rearwardly from said inclined section, and pivotal connecting means between said front and rear bars, said arm being in supporting engagement with said rod; said bracket comprising a straight bar to which said main control rod is rigidly secured, and an angle bar adjustably secured to said straight bar; and pedal clamping means secured to said angle bar.

12. In a loosely mounted dual pedal control device for an automobile having a horizontal floor and an inclined floor board adjacent thereto, a main control rod, a bracket rigidly secured to one end thereof and adapted for attachment to the pedal, and a supporting member at the other end of the rod; said member comprising a rear bear adapted to rest upon the floor of the automobile and having a seat abutment member at the rear thereof, a front bar having an upwardly and forwardly inclined section adapted to rest against the inclined floor board of the automobile and an arm extending rearwardly from said inclined section, and pivotal connecting means between said front and rear bars, said rod being loosely supported by said arm, whereby the rod may be moved relative to the supporting member, said main control rod being adjustable as to length.

13. In a loosely mounted dual pedal control device for an automobile having a horizontal floor and an inclined floor board adjacent thereto, a main control rod, a bracket at one end thereof adapted for attachment to the pedal, and a supporting member at the other end of the rod; said member comprising a rear bar adapted to rest upon the floor of the automobile and having a seat abutment member at the rear thereof, a front bar movably connected to said rear bar and having an upwardly and forwardly inclined section adapted to rest against the inclined floor board of the automobile and an arm extending rearwardly from said inclined section, said arm being in supporting engagement with said rod.

IRA J. EHRENBERG.

No references cited.